(12) United States Patent
Zhu et al.

(10) Patent No.: US 8,805,374 B2
(45) Date of Patent: Aug. 12, 2014

(54) MULTI-RADIO HANDOVER MANAGER SYSTEM AND ALGORITHMS FOR HETEROGENEOUS WIRELESS NETWORKING

(75) Inventors: Jing Zhu, Portland, OR (US); Mats Agerstam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 13/154,704

(22) Filed: Jun. 7, 2011

(65) Prior Publication Data

US 2012/0315905 A1    Dec. 13, 2012

(51) Int. Cl.
*H04W 36/00*    (2009.01)

(52) U.S. Cl.
USPC .......................................... 455/436; 455/443

(58) Field of Classification Search
USPC .................. 370/328, 331, 332, 334, 338; 455/436–439, 442, 444
See application file for complete search history.

(56) References Cited

U.S. PATENT DOCUMENTS

| | | | |
|---|---|---|---|
| 7,907,572 | B2 | 3/2011 | Yang et al. |
| 2007/0265003 | A1* | 11/2007 | Kezys et al. ................ 455/435.1 |
| 2008/0025275 | A1* | 1/2008 | Cheng et al. ................... 370/338 |
| 2008/0102843 | A1 | 5/2008 | Todd et al. |
| 2008/0113692 | A1* | 5/2008 | Zhao et al. ..................... 455/574 |
| 2008/0139200 | A1 | 6/2008 | Zhu et al. |
| 2009/0003303 | A1 | 1/2009 | Zhu et al. |
| 2010/0027525 | A1 | 2/2010 | Zhu |
| 2011/0212724 | A1* | 9/2011 | Wirtanen et al. ........... 455/435.2 |

FOREIGN PATENT DOCUMENTS

| | | |
|---|---|---|
| WO | 2008039962 A2 | 4/2008 |
| WO | 2012170346 A2 | 12/2012 |

OTHER PUBLICATIONS

Bellavista, et al., "Mobility-aware Management of Internet Connectivity in Always Best Served Wireless Scenarios", Mobile Networks and Applications, vol. 14, Issue 1, Feb. 2009, pp. 18-34.
International Search Report and Written Report received for PCT Application No. PCT/US2012/040728 mailed on Jan. 25, 2013, 10 pages.
International Preliminary Report on Patentability received for PCT Patent Application No. PCT/US2012/040728, mailed on Dec. 27, 2013, 7 Pages.

* cited by examiner

*Primary Examiner* — George Eng
*Assistant Examiner* — Jing Gao
(74) *Attorney, Agent, or Firm* — Carrie A. Boone, P.C.

(57) ABSTRACT

A multi-radio handover manager and supporting algorithms are disclosed. The multi-radio handover manager (MRHM) minimizes the "on" time of one radio when the other radio is connected to the Internet. The MRHM also prevents unnecessary inter-RAT (radio access technologies) WLAN-to-WWAN handovers in a "multi-AP" WLAN, where intra-RAT WLAN-to-WLAN (layer 2) roaming is possible. The MRHM minimizes the impact of IP address changes due to WWAN-to-WLAN handover on an active TCP/IP session. And, the MRHM optimizes its handover-triggering algorithm based on traffic and environment.

11 Claims, 12 Drawing Sheets

MULTI-RADIO HANDOVER MANAGER SYSTEM AND ALGORITHMS FOR HETEROGENEOUS WIRELESS NETWORKING

TECHNICAL FIELD

This application relates to mobile devices having multiple radios and, more particularly, to the automatic handover from one radio to another within the mobile device.

BACKGROUND

Mobile devices, such as laptops, etc., are increasingly equipped with both wireless local area network (WLAN) devices (e.g., Wi-Fi) and wireless wide area network (WWAN) devices (e.g., 2G/3G cellular, LTE, WiMAX) radios, enabling the user to connect to the Internet over the "best" available network. For example, when a user is at home, the mobile device may access the Internet through a home WLAN, which usually provides higher bandwidth than a WWAN. When the user is mobile, such as when in a moving vehicle, the mobile device can remain connected to the Internet through the WWAN, which generally has a much larger coverage area. (LTE is short for "long-term evolution"; 2G cellular is short for second generation cellular technology; 3G cellular is short for third generation cellular technology; WiMAX is short for "worldwide interoperability for microwave access".)

There exists no control logic on today's mobile wireless platform, such as laptop computers, to turn on and off the second radio while there is already a first radio connected to the Internet, for providing seamless Internet connectivity. The user must manually switch the Internet connectivity to the second radio on the mobile device, such as by using the "On/Off" button of the Connection Utility/Manager.

It is, however, possible to keep both the WLAN and WWAN radios on continuously so that the operating system, such as Windows 7, will determine which radio/network to use for a particular application, based on a routing table. The drawback of this approach is that power consumption will be higher, since both radios are on all the time, even though one of them might be used at any given time. Furthermore, such an approach will not work if multiple radios are limited by radio frequency (RF) coexistence.

Thus, there is a continuing need for a solution that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a multi-radio handover manager and supporting algorithms are disclosed. The multi-radio handover manager (MRHM) minimizes the "on" time of one radio when the other radio is connected to the Internet. The MRHM also prevents unnecessary inter-RAT (radio access technologies) WLAN-to-WWAN handovers in a "multi-AP" WLAN, where intra-RAT WLAN-to-WLAN (layer 2) roaming is possible. The MRHM minimizes the impact of IP address changes due to WWAN-to-WLAN handover on an active TCP/IP session. And, the MRHM optimizes its handover-triggering algorithm based on traffic and environment.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

In some embodiments, at least four key ideas are included in the solution:

a WLAN-to-WWAN handover trigger algorithm based on both the signal strength of the currently connected WLAN access point and that of all the neighboring WLAN APs with the same SSID (service set identifier). The algorithm avoids unnecessary handover to the WWAN radio in a multi-access point (multi-AP) WLAN scenario, such as an office, airport, etc.

a WWAN-to-WLAN handover trigger algorithm based on device idle status. The algorithm minimizes the impact of internet protocol (IP) address change due to handover on active transmission control protocol/internet protocol (TCP/IP) sessions.

a "WWAN white list" run-time learning algorithm to track WWAN networks where the handover to WLAN is likely to happen. The WWAN white list minimizes false alarms and increases the success rate of the handover.

run-time adaptation/optimization of handover signal strength threshold based on traffic type and network environment.

I. Multi-Radio Handover Manager System and Algorithms

Figure 1:
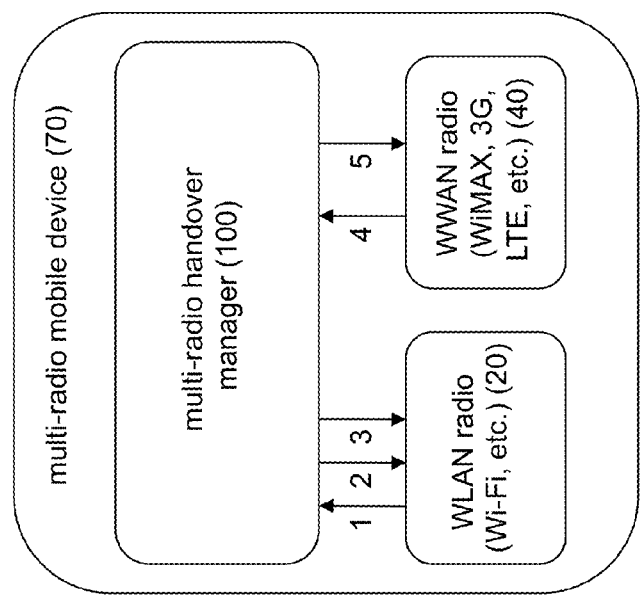
FIG. 1 is a schematic block diagram of a multi-radio mobile device, including a multi-radio handover manager, according to some embodiments.

FIG. 1 shows a diagram of a multi-radio handover manager (MRHM) 100, as part of a multi-radio mobile device 70, according to some embodiments. The multi-radio mobile device 70 has at least two radios. In FIG. 1, the mobile device 70 has a WLAN radio 20 (such as a Wi-Fi radio) and a WWAN radio 40 (such as a WiMAX, 2G cellular, 3G cellular, or LTE radio). The MRHM 100 determines when to turn on a second radio while a first radio remains connected to the Internet. Also, the MRHM 100 determines when to turn off the first radio after the second radio has been turned on. Thus, in FIG. 1, the MRHM 100 would turn on the WWAN radio 40, and then turn off the WLAN radio 20 (known herein as WLAN-to-WWAN handover). Alternatively, the MRHM would turn on the WLAN radio 20 and then turn off the WWAN radio 40 (known herein as WWAN-to-WLAN handover).

The MRHM 100 is not responsible for profile management, scanning, initial network entry, or other radio/network-specific operations, as these operations are managed by other entities, such as a connection manager/utility, and thus these operations are beyond the scope of this disclosure. In some embodiments, the MRHM 100 operates with mobile devices having co-existence limitations (in which only one radio may be operable at a time) and with mobile devices that do not have such limitations.

As indicated by the arrows in FIG. 1, there are five message exchanges between the MRHM 100 and the individual radio components. These message exchanges are represented by numbers 1-5:

1. WLAN status report (30)
2. WLAN ON/OFF command
3. WLAN scan command
4. WWAN status report (50)
5. WWAN ON/OFF command The WLAN ON/OFF command (2) and the WLAN scan command (3) are issued by the MRHM 100 to the WLAN radio 20, to turn the WLAN radio on, off, or to initiate a scan operation, respectively. The WWAN ON/OFF command (5) is issued by the MRHM 100 to the WWAN radio 40, to turn the WWAN radio on or off, respectively. These operations are initiated by the MRHM 100 and sent to the appropriate radio.

The other two message exchanges, the WLAN status report 30 (1) and the WWAN status report 50 (4) are sent from the respective WLAN and WWAN radios to the MRHM 100. These status reports are available to the MRHM 100 even when the respective radios are not turned on. The WLAN status report 30 and WWAN status report 50 are described in more detail below.

WLAN Status Report (30).

Figure 2:
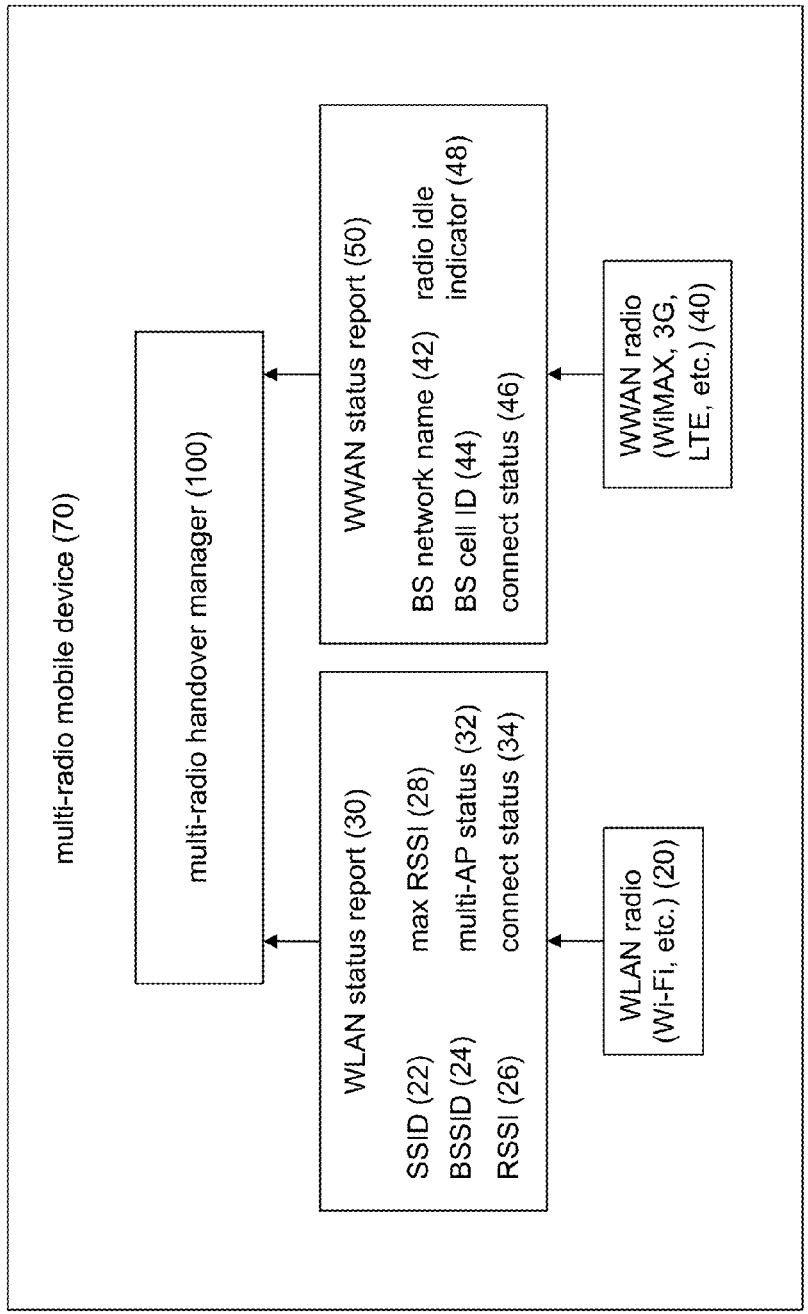
FIG. 2 is a diagram showing the status reports that are sent by the WLAN and WWAN radios to the multi-radio handover manager of FIG. 1, according to some embodiments.

FIG. 2 is a block diagram illustrating the status indicators that are supplied via the WLAN status report 30 and the WWAN status report 40 from the respective radios 20, 40 to the MRHM 100, according to some embodiments. The WLAN status report 30 is sent from the WLAN radio 20 to the MRHM 100 and includes the following information:

SSID (service set identifier) 22 of the connected WLAN AP

BSSID (basic service set identifier) 24 of the connected WLAN AP RSSI 26 (received signal strength indicator) from the connected WLAN AP maximum RSSI 28, the maximum signal strength from all the neighboring WLAN APs sharing the same SSID multi-AP status 32: 0 or 1
   0: does not exist
   1: exists connection status 34: 0 or 1
   0: not connected
   1: connected In some embodiments, the WLAN status report 30 is sent periodically (e.g., every second) to the MRHM 100.

WWAN Status Report (50).

Also illustrated in FIG. 2, the WWAN status report 50 is sent from the WWAN radio 40 to the MRHM 100 and includes the following information:

network name 42 of the connected WWAN base station base station (cell) ID 44 of the connected WWAN base station connection status 46: 0 or 1
   0: not connected
   1: connected radio idle indicator 48: 0 or 1
   0: the radio is not actively transmitting or receiving traffic
   1: the radio device is actively transmitting or receiving traffic In some embodiments, the WWAN status report 50 is sent periodically (e.g., every second).

WLAN or WWAN ON/OFF Command.

The WLAN or WWAN ON/OFF command is sent by the MRHM 100 to the respective radio to turn the radio ON or OFF.

WLAN Scan Command.

The WLAN scan command is sent by the MRHM 100 to the WLAN radio 20 to perform a scanning operation. The scanning operation measures the maximum RSSI of the radio.

Figure 3:
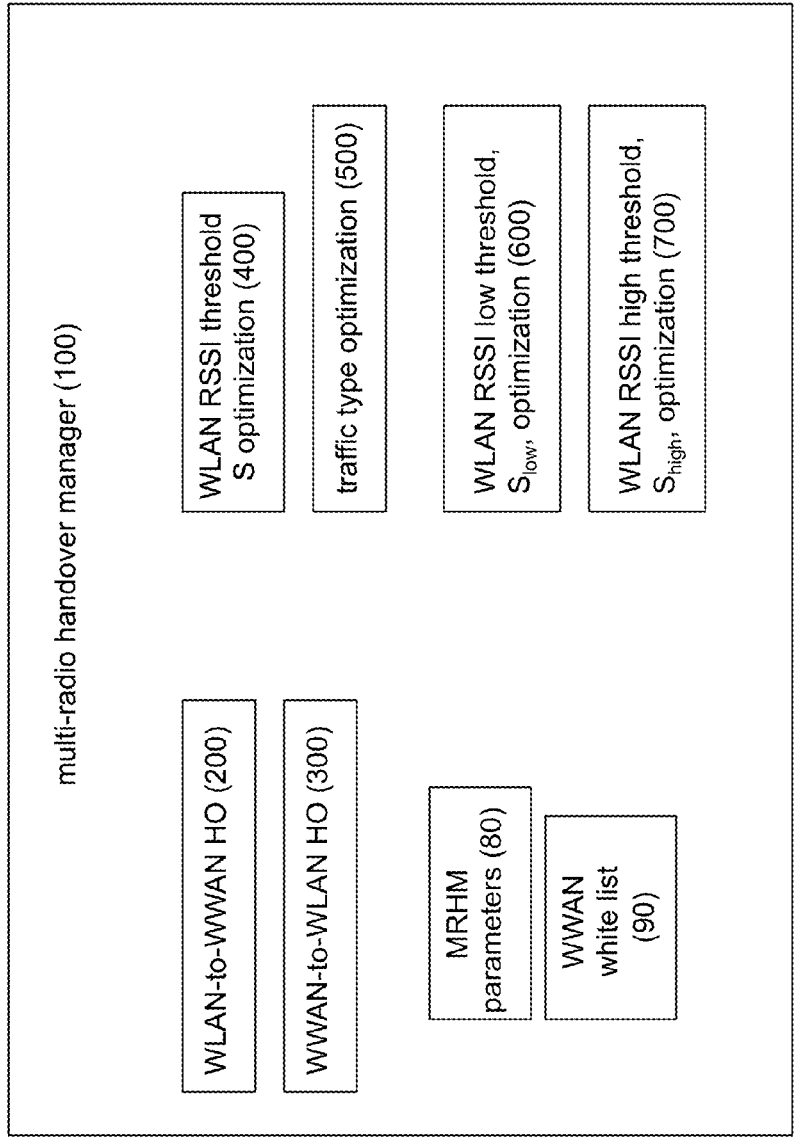
FIG. 3 is a detailed block diagram of the multi-radio handover manager of FIG. 1, according to some embodiments.
Figure 5:
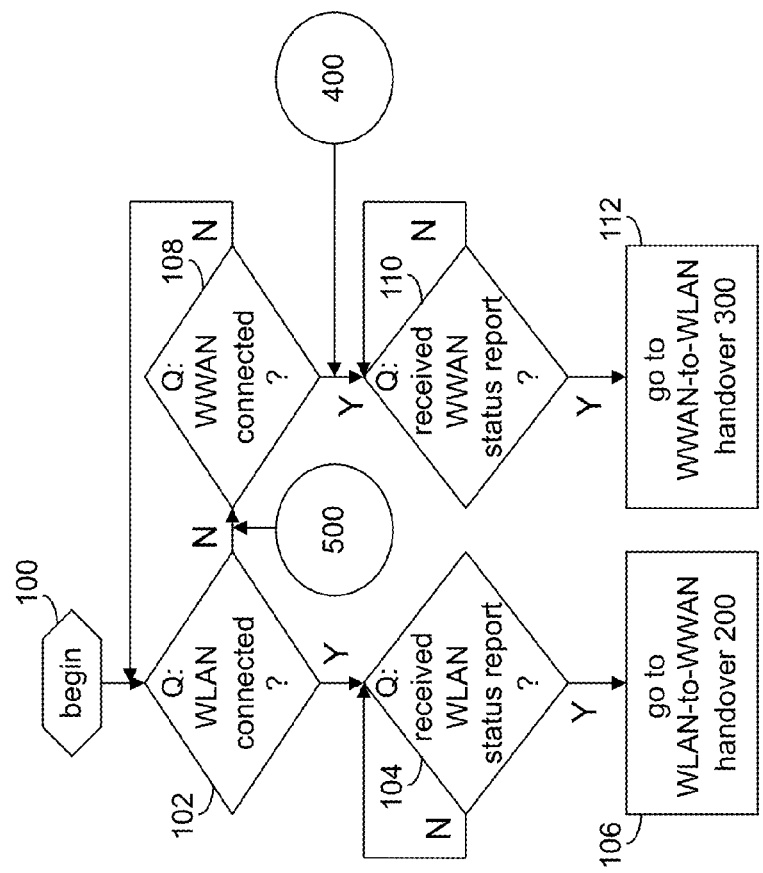
FIG. 5 is a flow diagram of the main procedure of the multi-radio handover manager of FIG. 1 in performing automatic handover between WLAN and WWAN radios, and vice-versa, according to some embodiments.
Figure 6:
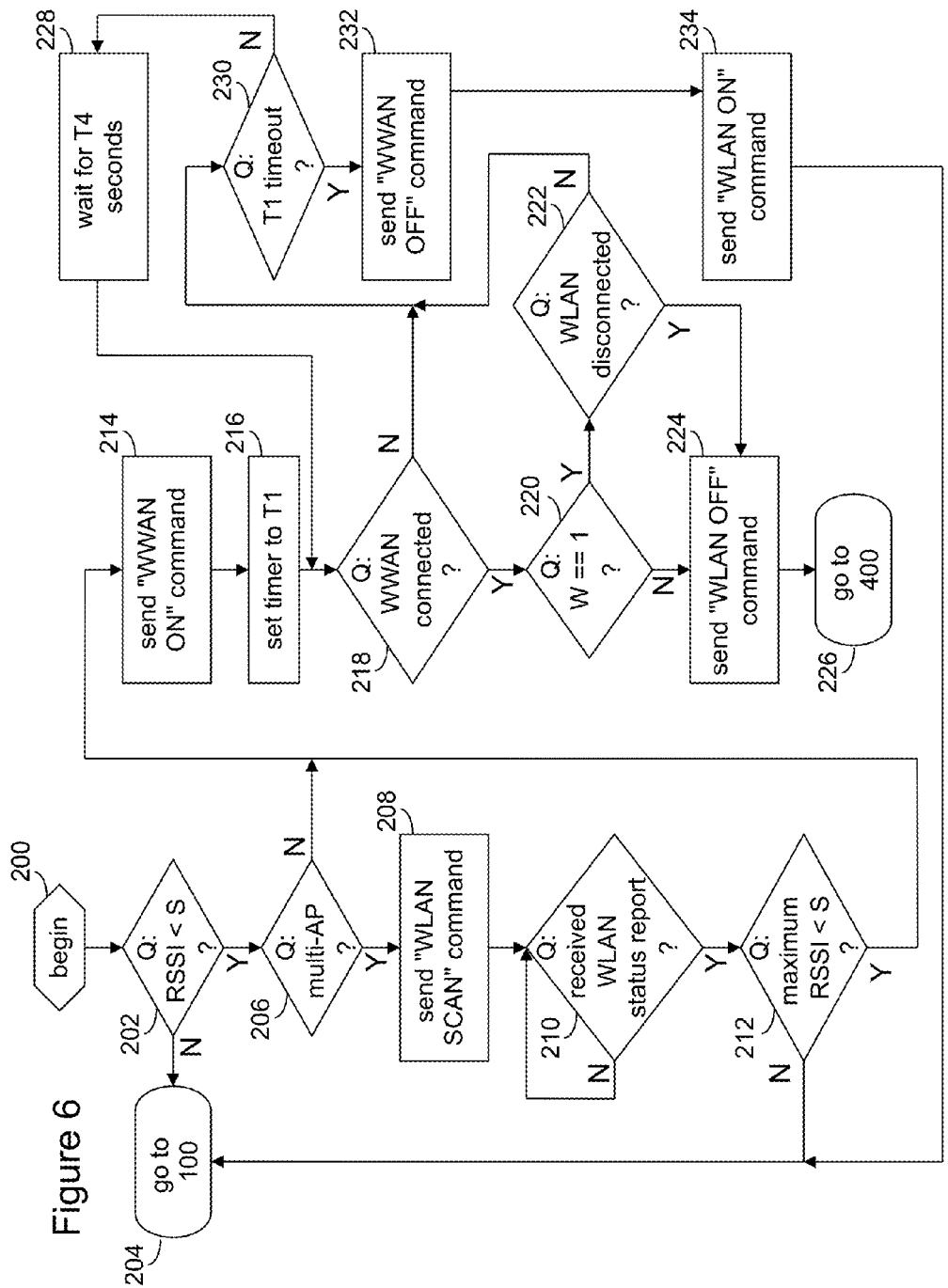
FIG. 6 is a flow diagram showing WLAN-to-WWAN handover performed by the multi-radio handover manager of FIG. 1, according to some embodiments.
Figure 7:
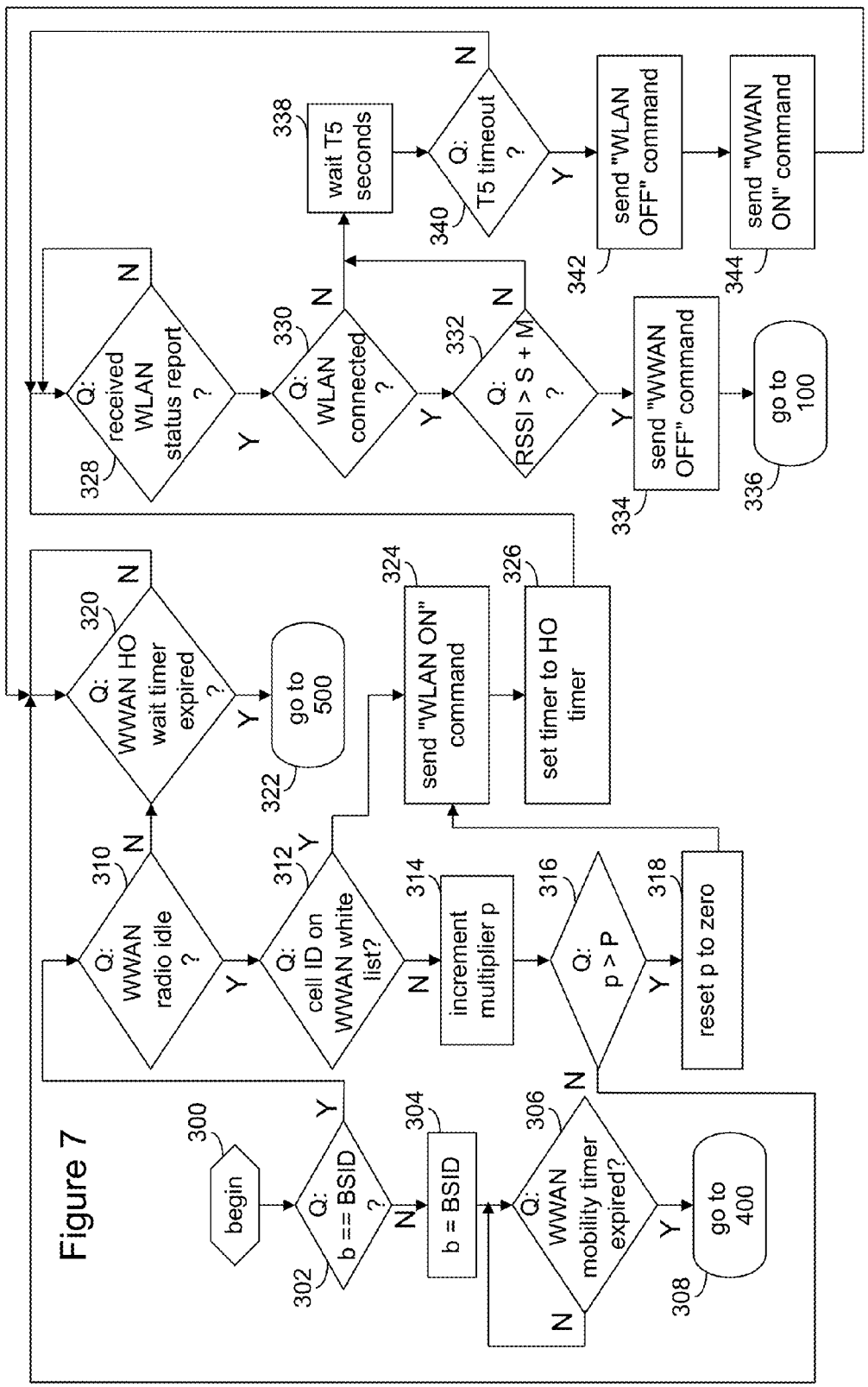
FIG. 7 is a flow diagram showing WWAN-to-WLAN handover performed by the multi-radio handover manager of FIG. 1, according to some embodiments.

FIGS. 5, 6, and 7 are flow charts illustrating operations performed by the multi-radio handover manager 100, according to some embodiments. Before describing the MRHM operations in detail, the block diagram of FIG. 3 shows some of the structure used by the MRHM 100. The MRHM 100 performs WLAN-to-WWAN handover 200 and WWAN-to-WLAN handover 300, and, further, includes a WLAN RSSI threshold (S) optimization routine 400, a traffic type optimization routine 500, a WLAN RSSI low threshold ($S_{low}$) optimization 500 and a WLAN RSSI high threshold ($S_{high}$) optimization 600. Additionally, the MRHM 100 uses system configuration parameters 80 and a WWAN white list 90 in performing its operations. Each of the elements depicted in FIG. 3 are described in more detail, below.

Figure 4:
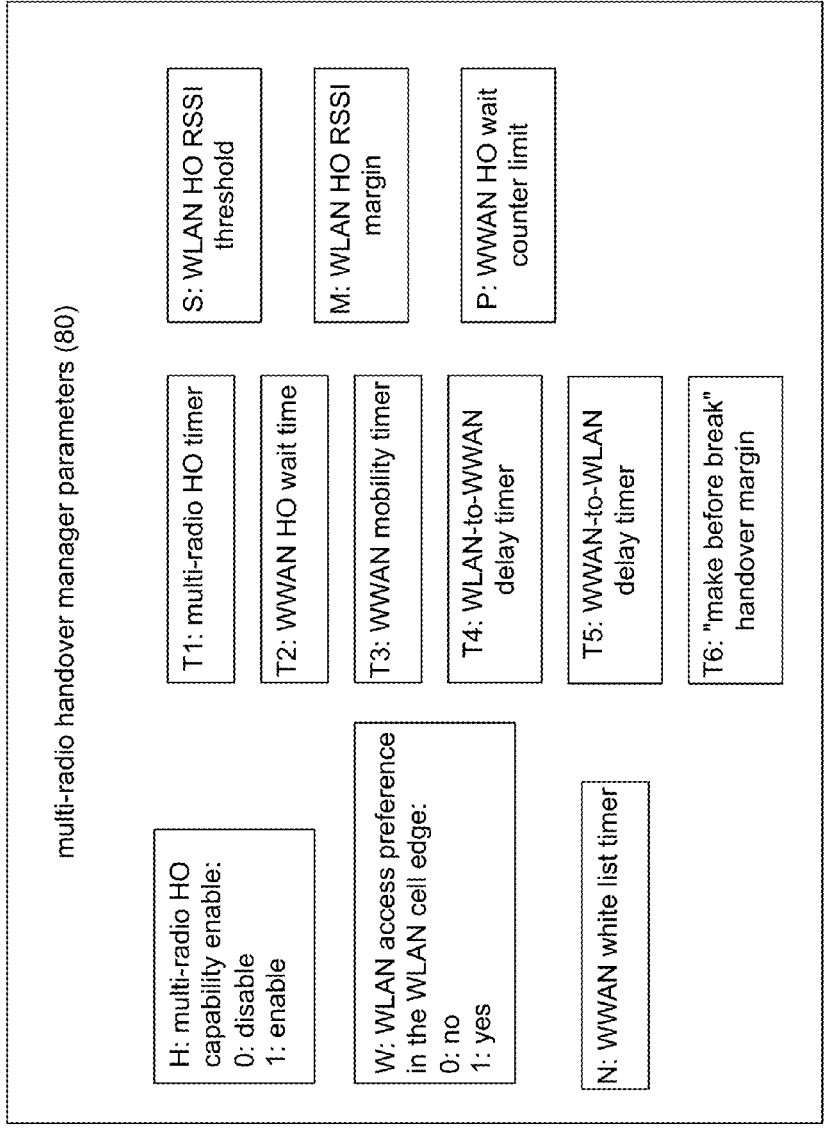
FIG. 4 is a block diagram showing the parameters used by the multi-radio handover manager of FIG. 1, according to some embodiments.

The block diagram of FIG. 4 shows the system configuration parameters 80 used by the MRHM 100. The system configuration parameters 80 are established during the initial configuration of the multi-radio mobile device 70 and are subsequently available to the MRHM 100:

H: multi-radio handover capability enable (0: disable, 1: enable)

W: WLAN access preference in the WLAN cell edge (0: no, 1: yes)

T1: multi-radio handover timer (e.g., 1 minute) defines the maximum allowable time to determine whether handover has completed T2: WWAN handover wait time (e.g., 1 minute) defines the minimum time between two "WLAN ON" commands during the WWAN-to-WLAN handover T3: WWAN mobility timer (e.g., 2 minutes) defines the minimum time after connecting to a new WWAN base station that the WWAN radio must wait for before the MRHM 100 sends a "WLAN ON" command during the WWAN-to-WLAN handover T4: WLAN-to-WWAN delay timer (used in FIG. 6)

T5: WWAN-TO-WLAN delay timer (used in FIG. 7)

T6: "make before break" handover margin (used in FIG. 8)

S: WLAN handover RSSI threshold defines the minimum RSSI to trigger the "WWAN ON" command during the WLAN-to-WWAN handover M: WLAN handover RSSI margin defines the difference between the WLAN RSSI threshold of the WWAN-to-WLAN handover and that of the WLAN-to-WWAN handover P: WWAN handover wait counter limit defines the number of WWAN handover wait timer timeouts (T2) before a "WLAN ON" command can be sent. It is only used if the currently connected WWAN base station is not on the white list. As a result, the minimum time between two "WLAN ON" commands is significantly increased to T2×P.

N: WWAN white list timer defines the maximum number of days between the last successful WWAN-to-WLAN handover of a WWAN base station and removing it from the white list.

The initial operations performed by the MRHM 100 are depicted in the flow diagram FIG. 5, according to some embodiments. In this initial phase, the MRHM 100 decides whether to switch from WLAN to WWAN radio operation, switch from WWAN to WLAN operation, or to maintain the mobile device 70 in its current configuration (no change to radio operation). In some embodiments, the MRHM 100 will not commence unless the underlying connection manager or individual radio has indicated that profiles for both a WLAN radio and a WWAN radio exist. Further, the MRHM 100 operates only if the "multi-radio HO enable" configuration parameter (H) is set to enabled (FIG. 4).

Once the multi-radio handover is enabled and profiles for both types of radios exist, the MRHM 100 determines which radio is connected, WLAN or WWAN. If the WLAN radio 20 is connected (block 102), the MRHM 100 waits until a WLAN status report 30 is received from the WLAN radio (block 104), as depicted in FIG. 2. Until the status report 30 is received, the MRHM 100 takes no further action. Once the status report 30 is obtained, the MRHM 100 proceeds to the WLAN-to-WWAN handover procedure 200 (block 106), which is described in FIG. 6, below.

If the WLAN radio 20 is not connected ("no" prong of block 102), the MRHM 100 determines whether the WWAN radio 40 is connected (block 108). If not, the MRHM 100 again checks whether a WLAN radio 20 is connected (block 102). Until either a WLAN radio 20 or a WWAN radio 40 is connected, the MRHM 100 takes no further action, as handover operations are unnecessary when no radio is active. If the WWAN radio 40 is connected (the "yes" prong of block 108), the MRHM 100 waits for a WWAN status report 50 from the WWAN radio 40 (block 110), as depicted in FIG. 2. Until the status report 50 is received, the MRHM 100 takes no further action. Once the status report 50 is obtained, the MRHM 100 proceeds to the WWAN-to-WLAN handover procedure 300 (block 112), which is described in FIG. 7, below. The WLAN-to-WWAN handover 200 (FIG. 6) and WWAN-to-WLAN handover 300 (FIG. 7) are described separately in the following paragraphs.

WLAN-to-WWAN Handover 200.

FIG. 6 is the flow diagram describing in detail the WLAN-to-WWAN handover 200, according to some embodiments. Recall that, by the time the operations 200 commence, the WLAN status report 30 has been obtained by the MRHM 100 from the WLAN radio 20 (FIG. 5). The MRHM 100 first checks whether the received signal strength indicator (RSSI) 26 from the WLAN status report 30 is below the WLAN handover RSSI threshold (S) (block 202). The WLAN handover RSSI threshold (S) is one of the multi-radio handover manager parameters 80 (FIG. 4). If the RSSI 26 is not below the WLAN handover threshold (S), no handover will occur, and the MRHM 100 returns to the main procedure of FIG. 5 (block 204). If, instead, the RSSI 26 is below the WLAN handover RSSI threshold (S), the MRHM 100 then determines whether the connected WLAN radio 20 is a "multi-AP" radio (block 206). In some embodiments, a "multi-AP" radio is one in which multiple neighboring access points (APs) share the same service set identifier (SSID). The multi-AP status 32 is obtained by the MRHM 100 from the WLAN status report 30 (FIG. 2).

If the WLAN radio 20 is deemed "multi-AP", the MRHM 100 sends a "WLAN scan" command to the WLAN radio 20 (block 208). Recall from FIG. 1 that the WLAN scan command is sent from the MRHM 100 to the WLAN radio 20. There is no similar WWAN scan command being issued to the WWAN radio 40. The WLAN scan command measures the maximum RSSI of the WLAN radio 20, which is one of the status indicators (maximum RSSI 28) provided by the WLAN status report 30 in the next step.

Following the WLAN scan command (3) being issued by the MRHM 100 to the WLAN radio 20, the MRHM 100 waits for the WLAN status report 30 (block 210). Until the WLAN status report 30 is obtained, the MRHM 100 takes no further action. This is actually the second time the WLAN status report 30 has been received by the MRHM 100 (the first time being in the main procedure, FIG. 5). Following the first receipt of the WLAN status report 30, the RSSI 26 and the multi-AP status 32 parameters are examined (blocks 202 and 206); upon receiving the status report 30 a second time, the maximum RSSI 28, generated by the WLAN scan command, is examined.

The WLAN status report 30, among other things, provides the MRHM 100 with the maximum RSSI 28 (FIG. 2). The MRHM 100 checks whether the maximum RSSI 28 is below the WLAN handover RSSI threshold (S) (block 212), which is one of the MRHM parameters 80 (FIG. 4). If the maximum RSSI is below the threshold S, the MRHM 100 returns to the main procedure of FIG. 5 (block 204).

Otherwise, the maximum RSSI 28 is not below the WLAN handover RSSI threshold S (the "yes" prong of block 212), and the MRHM 100 subsequently sends a "WWAN ON" command to the WWAN radio 40 (block 214). Also, if the first WLAN status report 30 indicates that the WLAN radio 20 does not support multiple access points (block 206), the MRHM 100 proceeds to send the "WWAN ON" command to the WWAN radio (block 214). At this point, the MRHM 100 also starts a multi-radio handover timer (T1) (block 216) one of the MRHM parameters 80 (FIG. 4).

The MRHM 100 next checks whether the WWAN radio 40 is connected (block 218). If the WWAN radio 40 gets connected and the WLAN radio 20 disconnects before the handover timer (T1) expires, the WLAN-to-WWAN handover 200 completes successfully. Otherwise, the MRHM 100 will turn off the WWAN radio 40 (block 232), turn the WLAN radio 20 back on (block 234), and start over in the main procedure (block 204). The remaining steps of FIG. 6 achieve these goals.

If the WWAN radio 40 is connected (the "yes" prong of block 218), the MRHM 100 determines whether the WLAN access preference in the WLAN cell edge (W) is enabled (block 220). The WLAN access preference in the WLAN cell edge is one of the MRHM parameters 80 available to the MRHM 100 (FIG. 4). The W parameter enables the user of the mobile device 70 to control the behavior of the mobile device when at the edge of the WLAN cell, if desired.

If the parameter W is set to 0 (disabled), this means that the mobile device 70 has no WLAN access preference if physically located at the edge of the WLAN cell. If the WLAN access preference is disabled, then the MRHM 100 sends a "WLAN OFF" command to the WLAN radio 20 (block 224), and the WLAN-to-WWAN handover 200 is successfully completed. The MRHM 100 returns to the main procedure of FIG. 5, but not to the initial point, since the WWAN radio 40 is turned on, but to the point in the main procedure after the WWAN is connected, shown in FIG. 5 as "400" (block 226).

If, instead, the parameter W is 1 (enabled), then the MRHM 100 checks whether the WLAN radio 20 is disconnected (block 222). If so, the MRHM 100 sends a "WLAN OFF" command to the WLAN radio 20 (block 224) and control proceeds to the main procedure, FIG. 5, at point 400 (block 226).

If instead, the WWAN radio 40 is not connected (block 218), the MRHM 100 checks whether the multi-radio handover timer T1 has timed out or expired (block 230). If not, the MRHM 100 waits for T4 seconds (block 228) before checking the WWAN connection status again (block 218). Recall from FIG. 4 that T4 is one of the multi-radio handover manager parameters 80 that are available to the mobile device 70 upon initialization, and it is configurable. In some embodiments, the delay timer T4 is ten seconds.

If the T1 timer has expired (the "yes" prong of block 230), the MRHM 100 sends a "WWAN OFF" command to the WWAN radio 40 (block 232), then sends a "WLAN ON" command to the WLAN radio 20 (block 234), and the MRHM 100 returns to the beginning (100) of the main procedure in FIG. 5 (block 204). The operations of the WLAN-to-WWAN handover procedure 200 are thus complete.

WWAN White List.

Before describing the WWAN-to-WLAN handover procedure 300, the WWAN white list 90 first introduced in FIG. 3 is described. The WWAN white list 90 is a list of WWAN base stations that have previously been accessed by the mobile device 70. More particularly, the WWAN white list 90 consists of those base stations where at least one successful handover to a WLAN has happened in the last N days (the WWAN white list timer, FIG. 4). In some embodiments, the MRHM 100 treats WWANs that have been previously accessed preferentially over WWANs that have not previously been accessed by the mobile device 70, as described further below.

In some embodiments, the WWAN white list 90 is updated according to the following criteria:

the WWAN base station ID (BS cell ID 44) from the last WWAN status report 50 is added to the WWAN white list 90 if the WWAN-to-WLAN handover 300 is successful. The WWAN-to-WLAN handover 300 is considered successful if the WLAN radio 20 is connected within the multi-radio handover timer (T1) limit after the "WLAN ON" command is sent from the MRHM 100 to the WLAN radio. The MRHM 100 will keep the time of the last successful WWAN-to-WLAN handover 300 of each WWAN BSID 44 on the white list.

(2) WWAN BSID 44 is removed from the WWAN white list 90 if the WWAN-to-WLAN handover 300 from this base station has never been successful within the time period established by the WWAN white list timer (N) (e.g., 30 days).

WWAN-to-WLAN handover 300. FIG. 7 is the flow diagram describing in detail the WWAN-to-WLAN handover 300, according to some embodiments. Recall that the WWAN status report 50 is already obtained by the MRHM 100 from the WWAN radio 40 in the main procedure (FIG. 5). The MRHM 100 first checks whether the mobile device 70 has been connected with the same WWAN base station (based on the BSID) for longer than the time period specified by the WWAN mobility timer (T3) (FIG. 4).

Particularly, the MRHM 100 checks to see if the base station available to the mobile station 70 is the one that the MRHM 100 knows about (block 302), based on the status report 50 received from the WWAN radio 40. If not, the BSID of the newly identified base station is set as the new BSID (block 304). If the WWAN mobility timer (T3) is expired, then no further WWAN-to-WLAN processing takes place; instead, the MRHM 100 returns to the main procedure at the WWAN connected point (400) (block 308). These initial steps avoid the unnecessary turning on of the WLAN radio 20 while the mobile device 70 is moving, e.g., the user of the mobile device is driving a car or riding on a train.

Next, the MRHM 100 checks whether the WWAN radio 40 is idle (block 310). The WWAN radio would be idle, for example, if not much traffic is being transmitted actively over the WWAN radio 40. If the WWAN radio is not idle, the MRHM 100 will return to the main procedure (500) if the WWAN handover wait timer (T2) has expired (block 320).

If the WWAN radio 40 is idle, the MRHM 100 checks whether the base station cell id 44 is on the WWAN white list 90 (block 312). Recall that the WWAN white list 90 keeps track of WWANs in which a prior successful handover to the WLAN has taken place by the mobile station 70. If the currently connected WWAN base station is on the WWAN white list 90, the MRHM 100 sends a WLAN ON command to the WLAN radio 20 (block 324). Otherwise, the MRHM 100 increments a value, p (block 314). The p value is a multiplier which, together with the WWAN handover wait timer, T2, is used to determine the delay in this circumstance. If the base station cell ID is not on the WWAN white list 90 (block 312), then the MRHM 100 waits p*T2 seconds to scan for the WLAN signal. If the base station cell ID is on the WWAN white list 90, the MRHM 100 waits T2 seconds.

Following the increment, the MRHM 100 checks whether the value p has reached its limit, P (block 316). Recall that the WWAN handover wait counter limit (P) is one of the MRHM parameters 80 (FIG. 4). If not, the MRHM 100 will return to the main procedure (500) if the WWAN handover wait timer (T2) has expired (block 320). Otherwise, the value p has reached it limit (P) and the p value is thus reset (block 318).

The MRHM 100 will proceed to turn the WLAN on (block 324) if the currently connected WWAN base station is on the white list 90 (the "yes" prong of block 312). Otherwise, the MRHM 100 proceeds if the value p reaches its limit (P), and returns to the main procedure (500) if not (block 322). This step further reduces unnecessary turning on of the WLAN radio 20, particularly when the WWAN base station does not have any useable WLAN in its coverage area.

After the WLAN radio 20 is turned on (block 324), the MRHM 100 starts the handover timer (T1) (block 326). The MRHM 100 then obtains the WLAN status report 30 from the WLAN radio 20 (block 328). The WLAN status report 30 is available for retrieval whether the WLAN radio 20 is connected or not. In fact, one of the parameters made available in the status report is the connect status 36 of the WLAN radio (FIG. 2). After the status report 30 is obtained, the MRHM confirms that the WLAN radio 20 is connected (block 330). If the WLAN radio 20 is not connected, the MRHM 100 waits T5 seconds (block 338), checks for a timeout (block 340), then waits for a new WLAN status report (block 328). Recall from FIG. 4 that T5 is one of the multi-radio handover manager parameters 80 that are available to the mobile device 70 upon initialization, and it is configurable. In some embodiments, the delay timer T5 is set to ten seconds.

If, instead, the WLAN radio 20 is connected, the received signal strength, RSSI 26, obtained from the WLAN status report 30 is compared to the WLAN handover RSSI threshold (S) plus the WLAN handover RSSI margin (M) (block 332), the latter of which are two of the MRHM parameters 80 (FIG. 4). The MRHM is determining whether the RSSI of the connected WLAN radio 20 exceeds these two parameters before the handover timer (T1) expires. The WLAN handover RSSI threshold (S) is the same threshold that was used in the WLAN-to-WWAN handover 200 (FIG. 6) and the WLAN handover RSSI margin (M) is used to avoid a "ping-pong" effect, in which the multi-radio handover manager decides to hand over from WLAN to WWAN shortly after handing over from WWAN to WLAN, or vice versa. If the RSSI 26 exceeds the sum of the two parameters (S+M), the MRHM 100 sends a WWAN OFF command to the WWAN radio 40 (block 334) and the WWAN-to-WLAN handover procedure 300 is complete, with control proceeding back to the main procedure (block 336).

If, instead, the timeout occurs (the "yes" prong of block 340), the MRHM 100 sends a "WLAN OFF" command to the WLAN radio 20 (block 342) and subsequently sends a "WWAN ON" command to the WWAN radio 40 (block 344), then repeats the steps, starting with the receipt of the WLAN status report (block 328). The operations of the WWAN-to-WLAN handover procedure 300 are thus complete.

II. Cognitive WLAN-to-WWAN Handover Algorithm

Figure 8:
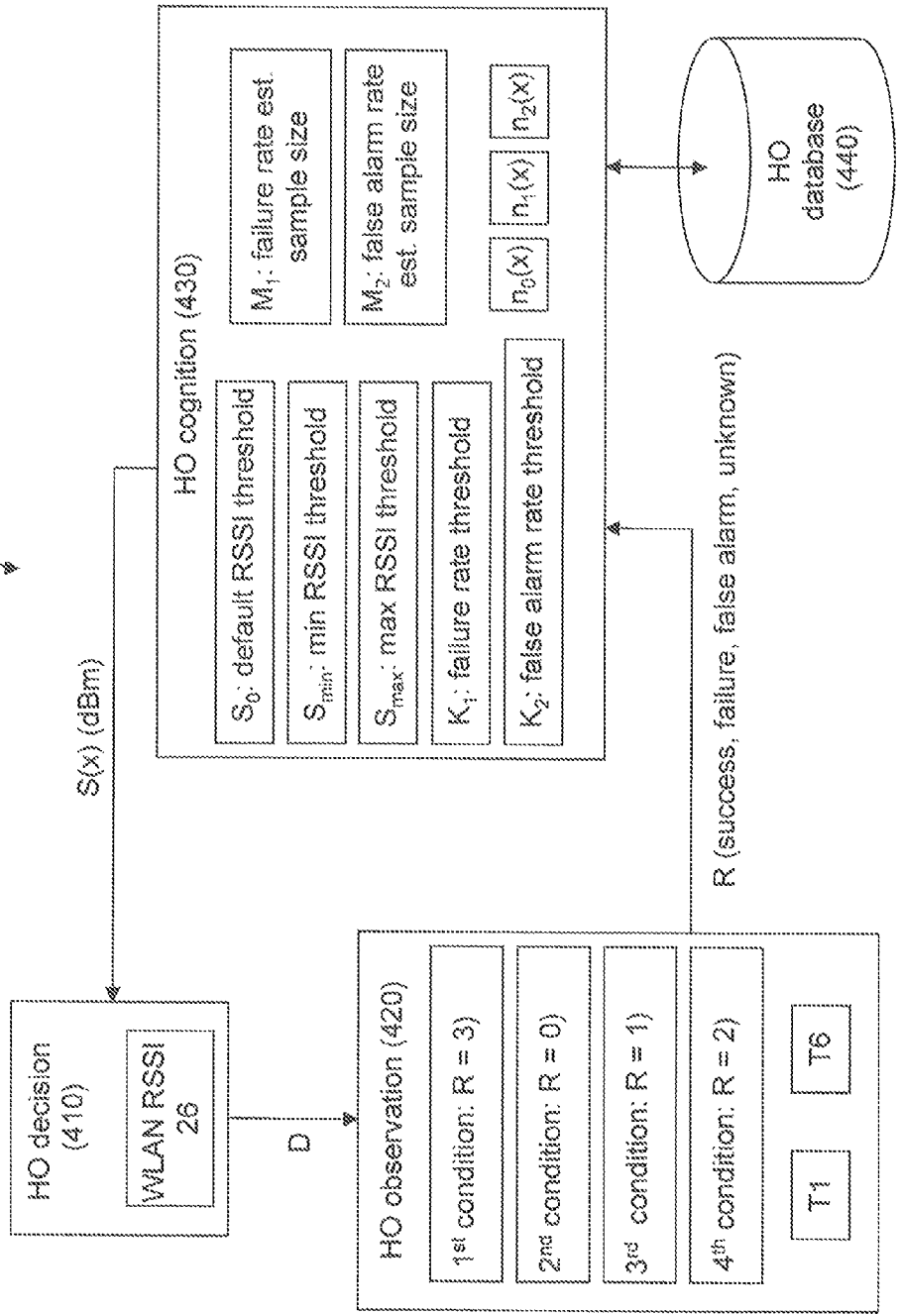
FIG. 8 is a system diagram of a WLAN handover RSSI threshold optimization performed by the multi-radio handover manager of FIG. 1, according to some embodiments.

In some embodiments, the MRHM 100 includes features to optimize the above operations. For example, FIG. 8 is a system diagram illustrating how the MRHM 100 adapts the WLAN handover RSSI threshold (the S parameter in FIG. 4) based on the network environment, according to some embodiments. Known herein as the WLAN handover RSSI threshold optimization 400, or the RSSI threshold optimization 400, for short, the algorithm consists of four functional blocks: a decision block 410, an observation block 420, a cognition block 430, and a database (DB) 440.

In some embodiments, the decision block 410 takes the signal threshold parameter, "S(x)", as an input, where the signal threshold parameter may vary for different WLAN radios, with the SSID 22 of a particular WLAN radio 20 being denoted as x. The decision block 410 then periodically compares the signal threshold parameter, S(x), against the WLAN signal strength measurement (RSSI), that is, the RSSI 26 value provided by the WLAN radio 20 in the WLAN status report 30 (FIG. 2), and, based on this comparison, generates an output signal, shown in FIG. 8 as, "D".

More particularly, the decision block 410 compares the RSSI 26 with the signal threshold parameter, S(x):
if (RSSI<S(x), then D=1; else D=0
Here, "D=1" means that the measured signal strength of the WLAN radio 20 is less than the signal threshold parameter, such that the WLAN-to-WWAN handover 200 (FIG. 6) is triggered. "D=0" means that the measured signal strength of the WLAN radio 20 is the same as or greater than the signal threshold parameter, such that the WLAN-to-WWAN handover 200 is not triggered. S(x) is created by the MRHM 100 and set to an initial value, $S_0$, if S(x) does not exist in the database 440.

As illustrated in FIG. 8, the observation block 420 observes the outcome (D) produced by the decision block 410 after the handover is triggered. The observation block 420 generates a result indicator, denoted as "R", which may be set to one of the following four values:
  0: success
  1: failure
  2: false alarm
  3: unknown The WLAN handover RSSI threshold optimization 400 initializes the following two timers, which were introduced in FIG. 4. In some embodiments, the optimization 400 uses the following values for T1 and T6:
  T1: multi-radio handover timer duration (e.g., 5 minutes)
  T6: "make before break" handover margin (e.g., 10 seconds)

The observation block 420 assigns a value to the results indicator, R, under the following four conditions:
  $1^{st}$ condition: if the WWAN radio is not connected within T1 seconds after the WLAN-to-WWAN decision is triggered, the observation block 420 sets R to 3
  $2^{nd}$ condition: if the WWAN radio is connected no less than T6 seconds before the WLAN radio is disconnected, the observation block 420 sets R to 0
  $3^{rd}$ condition: if the WWAN radio is connected within T1 seconds, but the connection is made later than T6 seconds before the WLAN radio is disconnected, the observation block 420 sets R to 1
  $4^{th}$ condition: if the WWAN radio is connected within T1 seconds, but the WLAN radio is not disconnected within T1 seconds, the observation block 420 sets R to 2 (known herein as a "false alarm" condition)

In this manner, the value, R, is updated, based on the four above conditions, and is sent to the cognition block 430.

The cognition block 430 learns from the past experience of the MRHM 100 to adjust the handover parameter, S(x), which is then sent to the decision block 410. Particularly, the cognition function 430 will estimate the failure rate and the false alarm rate, based on the value, R, received from the observation block 420.

In some embodiments, the cognition function 430 uses the following parameters, as illustrated in FIG. 8:
  $S_0$: the default signal strength threshold (e.g., −75 dBm)
  $S_{min}$: the minimum signal strength threshold (e.g., −70 dBm)
  $S_{max}$: the maximum signal strength threshold (e.g., −85 dBm)
  $K_1$: the failure rate threshold (e.g., 0)
  $K_2$: the false alarm rate threshold (e.g., 10%)
  $M_1$: the sample size of the failure rate estimation (e.g., 1)
  $M_2$: the sample size of the false alarm rate estimation (e.g., 100)

The cognition function 430 also uses the following variables:
  $n_0(x)$: the number of samples with R=0 for the given SSID (x)
  $n_1(x)$: the number of samples with R=1 for the given SSID (x)
  $n_2(x)$: the number of samples with R=2 for the given SSID (x)

For each triggered handover with R=0, 1, or 2, the cognition function 430 will add a new data sample (t, x, R) into the database 440, where t is the time stamp of the data sample, and will update the signal threshold parameter, S(x), in the database, based on the following algorithm:
  if $(n_1(x)/n_0(x)+n_1(x)+n_2(x))>K_1$ AND $(n_0(x)+n_1(x)+n_2))==M_1$), the cognition function 430 sets S(x)= max($S_{max}$, s(x)+1), and removes all the samples associated with SSID=x from the database 440;

if $(n_2(x)/n_0(x)+n_1(x)+n_2(x))>K_2$ AND $(n_0(x)+n_1(x)+n_2))==M_2)$, the cognition function 430 sets $S(x)=\min(S_{min}, s(x)-1)$, and removes all the samples associated with SSID=x from the database 440;

The database block 440 is responsible for storing historical handover data (t, x, R), as well as the latest signal strength threshold for each known SSID, i.e., S(x).

III. A Context-Aware Dual-Threshold WLAN-to-WWAN Handover Algorithm

Figure 9:
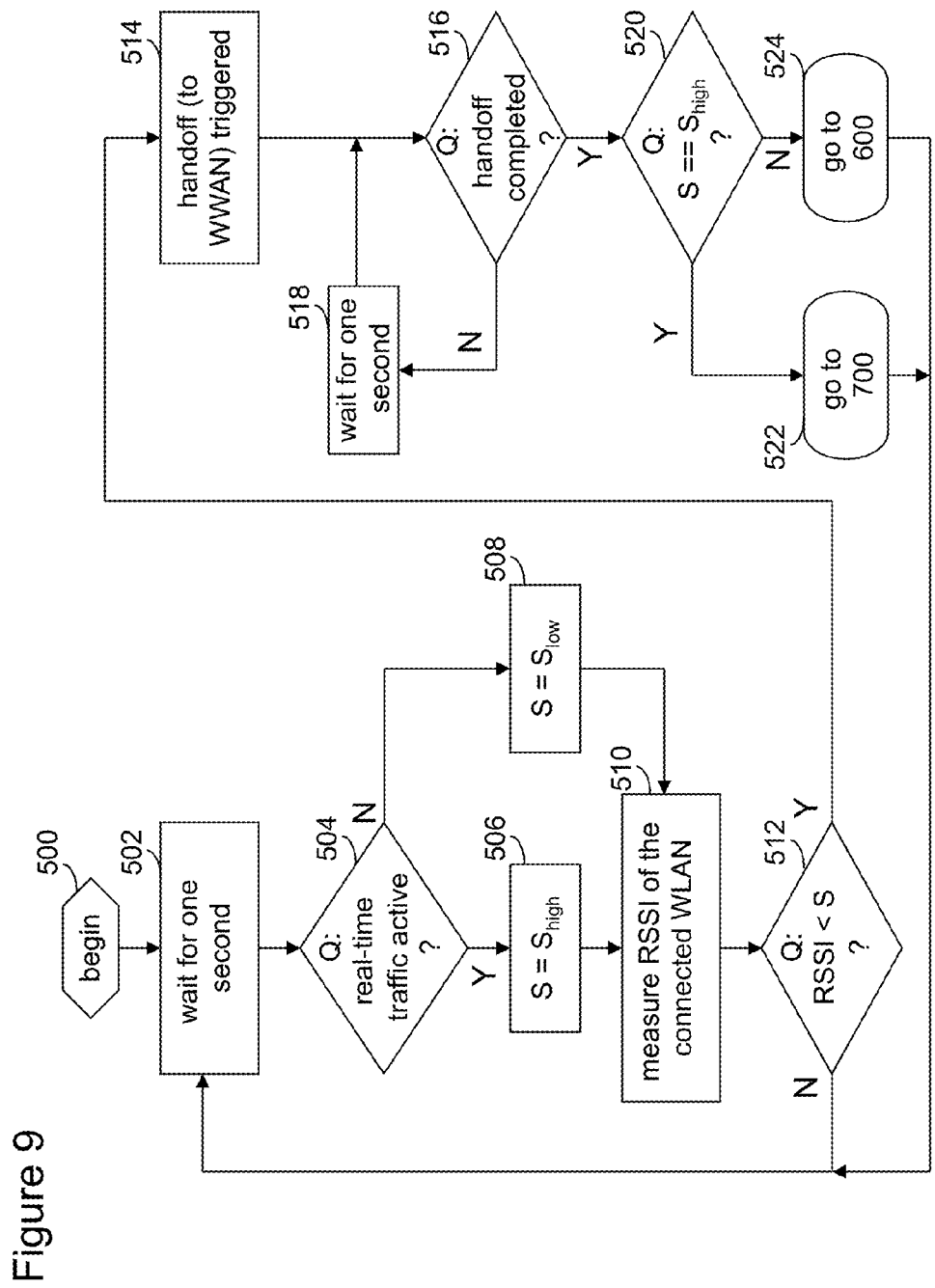
FIG. 9 is a flow diagram showing a traffic type optimization algorithm performed by the multi-radio handover manager of FIG. 1, according to some embodiments.

In addition to the WLAN handover RSSI threshold optimization algorithm 400, the MRHM 100 includes another optimization algorithm based on the network environment, known herein as a traffic type optimization 500. FIG. 9 is a flow chart of the algorithm 500 to adapt the signal strength threshold based on traffic type.

The traffic type optimization 500 commences with a determination, after a short delay (block 502), of whether real-time traffic, such as voice-over-IP (VoIP), is active or not (block 504). This is achieved, for example, by monitoring a differentiated service code point (DSCP) field in the header of IP packets. If real-time traffic is present, the WLAN handover RSSI threshold (S) is set to a high signal strength threshold, $S_{high}$ (block 506). If real-time traffic is not present, the WLAN handover RSSI threshold (S) is set to a low signal strength threshold, $S_{low}$ (block 508). Procedures to adjust the values of $S_{low}$ and $S_{high}$ are described in FIGS. 10 and 11, respectively. $S_{min}$ and $S_{max}$ (defined in the previous section) define the range of $S_{low}$ and $S_{high}$, with $S_{low}$ and $S_{high}$ being individually adapted based on whether real-time traffic is active or not.

Next, the traffic type optimization 500 measures the RSSI 26 of the currently connected WLAN radio 20 (block 510), and compares the measured RSSI against the WLAN handover RSSI threshold (S) (block 512). If the measured RSSI is below the threshold S, then the WLAN-to-WWAN handover 200 is initiated (block 514). If the handoff completes successfully (block 516), the WLAN handover RSSI threshold (S) is compared to the high signal strength threshold, $S_{high}$ (block 520). If the WLAN handover RSSI threshold (S) is not at the highest signal strength threshold, $S_{high}$, the procedure to adjust the low signal strength threshold value, $S_{low}$, is executed (block 524). Otherwise, the procedure to adjust the high signal strength threshold value, $S_{high}$, is executed (block 522). If the handoff does not complete (the "no" prong of block 516), the traffic type optimization 500 waits for one second (block 518) before again checking for completion of the handoff. The traffic type optimization 500 thus adjusts the WLAN handover RSSI threshold (S) based on whether traffic such as VoIP is being used by the mobile device 70.

Figure 10:
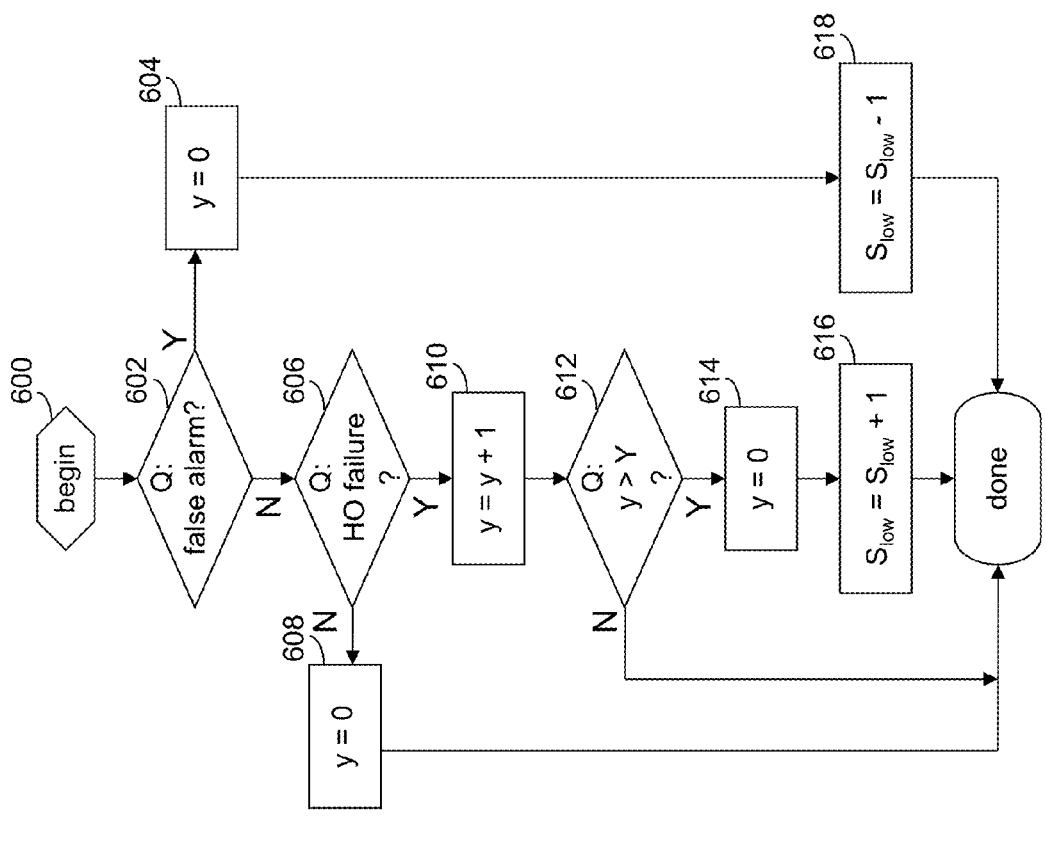
FIG. 10 is a flow diagram showing how to adjust the low RSSI threshold, used by the traffic type optimization of FIG. 9, according to some embodiments.
Figure 11:
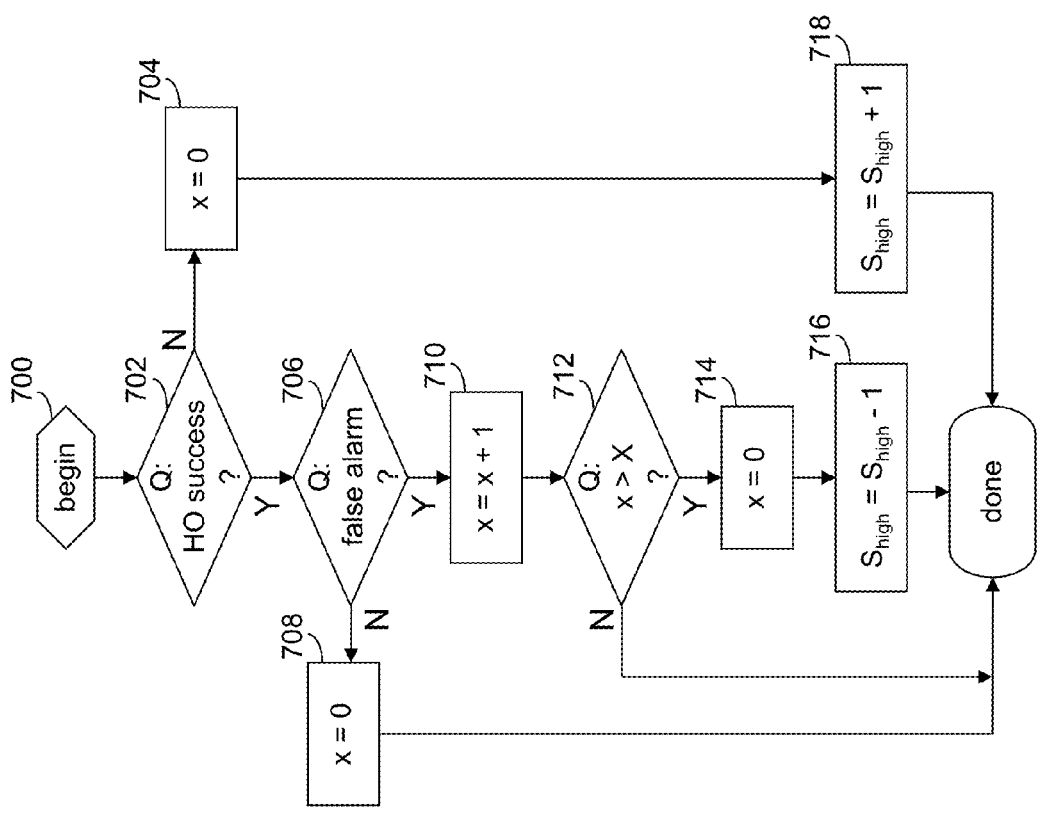
FIG. 11 is a flow diagram showing how to adjust the high RSSI threshold, used by the traffic type optimization of FIG. 9, according to some embodiments.

The MRHM 100 further includes optimizations for the signal strength threshold values, $S_{low}$ and $S_{high}$, as illustrated in the flow diagrams of FIGS. 10 and 11, respectively. In some embodiments, the values, $S_{low}$ and $S_{high}$, are adjusted following each handover operation by the MRHM 100.

FIGS. 10 and 11 show algorithms of how to adjust the low and high thresholds, $S_{low}$ and $S_{high}$, respectively, used in the traffic type optimization 500 of FIG. 9. These (high or low threshold) threshold adaptation algorithms are called after the corresponding threshold is used to trigger the handover.

FIG. 10 shows the flow chart of the low RSSI threshold $S_{low}$ optimization 600, according to some embodiments. The low RSSI threshold optimization 600 is designed so that the MRHM 100 avoids "false alarm" events and reduces the number of successive "handover failure" events to the handover failure limit (denoted as "y" in FIG. 10).

FIG. 11 shows the flow chart of the high RSSI threshold $S_{high}$ optimization 700, according to some embodiments. The high RSSI threshold optimization 700 is designed so that the MRHM 100 ensures "handover success" and reduces the number of successive "false alarm" events to the false alarm limit (denoted as "x" in FIG. 11).

In some embodiments, both x and y are configurable. Furthermore, the initial values of the low and high handover thresholds (denoted, $S_{low}$ and $S_{high}$, respectively) are configurable as well.

Figure 12:
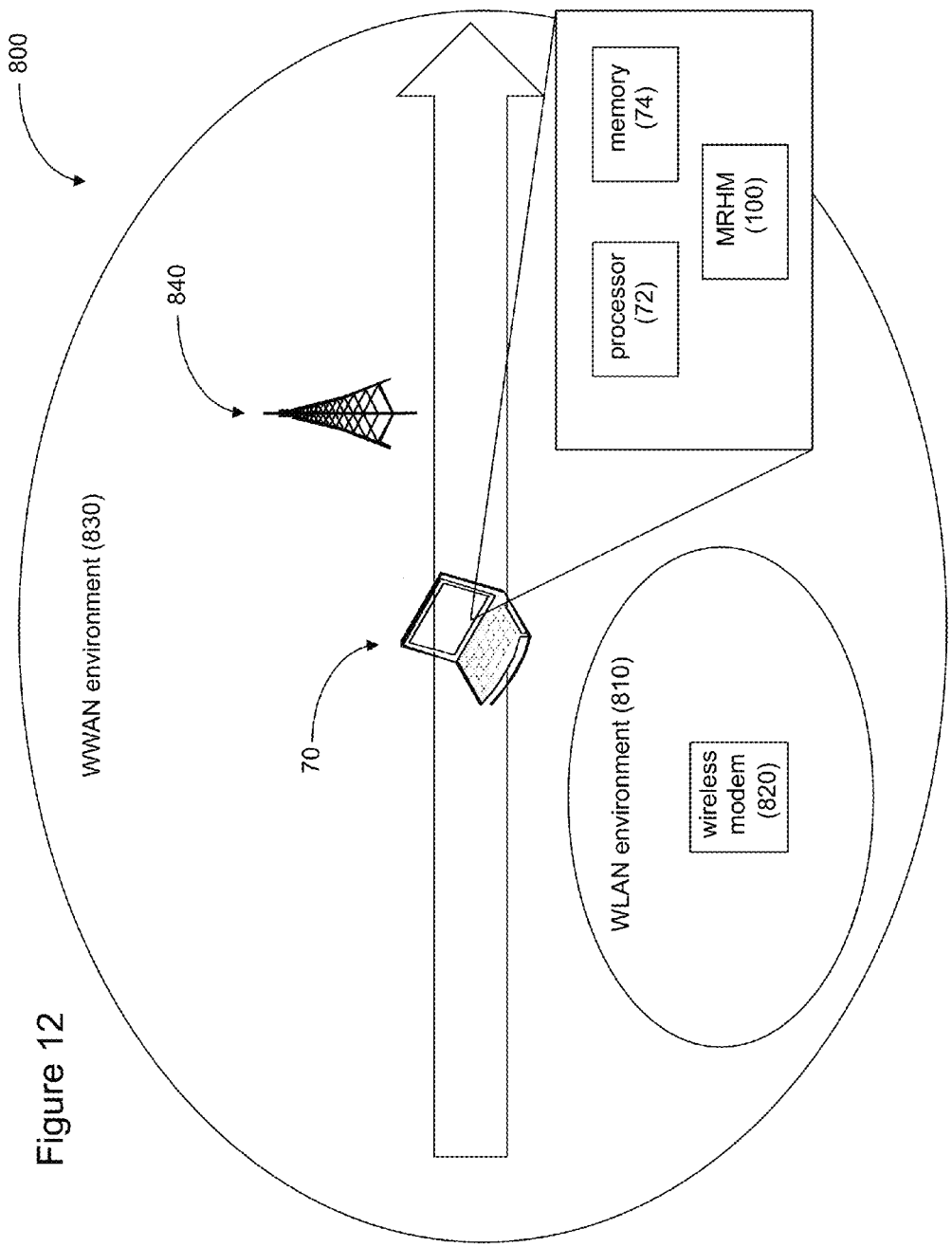
FIG. 12 is a system diagram showing the MRHM-capable mobile device of FIG. 1 traveling through a wireless neighborhood consisting of both a WLAN and a WWAN, according to some embodiments.

FIG. 12 is a schematic block diagram showing the MRHM-capable mobile device 70 of FIG. 1 in a wireless neighborhood 800, according to some embodiments. The wireless neighborhood 800 consists of both a WLAN environment 810, made possible by a wireless modem 820, such as one supporting a home office, and a WWAN environment 830, made possible by a base station 840. The WWAN environment 830 most likely consists of multiple base stations arranged throughout a community, enabling the mobile device 70 to maintain a connection in the WWAN environment 830 during mobility. Because the mobile device 70 is MRHM-capable, the mobile device 70 may switch from the WLAN environment 810 to the WWAN environment 830, and vice-versa.

The wireless device 70, whether it be a laptop computer, a smart phone, or other multi-radio device, consists of a processor 72 and a memory 74, so that the MRHM 100 can be loaded into the memory and executed by the processor. The MRHM 100 is executed to optimally perform handover operations between the WLAN environment 810 and the WWAN environment 830, without input by the user of the wireless device.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A multi-radio mobile device, comprising:
   a wireless local area network (WLAN) radio to connect to a WLAN, enabling the multi-radio mobile device to access the Internet;
   a wireless wide area network (WWAN) radio to connect to a WWAN, also enabling the multi-radio mobile device to access the Internet;
   a plurality of parameters of the mobile device, the plurality of parameters comprising a handover countdown timer, a WWAN white list timer, a WLAN handover received signal strength indicator (RSSI) threshold, WLAN handover RSSI margin, and a WWAN mobility timer, wherein the parameters are established when the mobile device is initialized;
   a handover manager to:
      turn off the WLAN radio after turning on the WWAN radio; and
      turn off the WWAN radio after turning on the WLAN radio, wherein turning off the WWAN radio after turning on the WLAN radio further comprises:
      confirming that the mobile device is connected to a WWAN base station specified by a base station identifier (BSID) from a WWAN status report and has been connected for longer than a time period specified by the WWAN mobility timer;
      confirming that the WWAN radio is "idle";
      sending a WLAN ON command to the WLAN radio and starting the handover countdown timer in response to the currently connected WWAN base station being on a WWAN white list, wherein the WWAN white list comprises WWANs in which a prior successful handover to the WLAN has occurred; and confirming that the WLAN radio gets connected and a RSSI of the WLAN radio exceeds a sum of the WLAN handover RSSI threshold and the WLAN handover RSSI margin before the handover countdown timer expires before turning the WWAN radio off.

2. The multi-radio mobile device of claim 1, wherein the WLAN radio further:

periodically sends a WLAN status report to the handover manager, wherein the WLAN status report comprises:
  a service set identifier (SSID) of a WLAN access point (AP) to which the mobile device is connected;
  a basic SSID of the connected WLAN AP;
  a WLAN received signal strength indicator (RSSI) of the connected WLAN AP;
  a maximum RSSI of all neighboring WLAN APs sharing the same SSID as the WLAN AP;
  a multiple access point status, indicating whether multiple APs exist or not; and
  a connection status, indicating whether the WLAN radio is connected to an AP or not.

3. The multi-radio mobile device of claim 1, wherein the WWAN radio further:

periodically sends the WWAN status to the handover manager, wherein the WWAN status report comprises:
  a network name of a WWAN base station to which the WWAN is connected;
  a base station cell identifier of the connected WWAN base station;
  a connection status, indicating whether the WWAN radio is connected to the WWAN base station or not; and
  a radio idle indicator, indicating whether the WWAN radio is actively transmitting or receiving traffic.

4. The multi-radio mobile device of claim 1, wherein the handover manager turns off the WLAN radio after turning on the WWAN radio by:

receiving a WLAN status report from the WLAN radio, from which the handover manager confirms that the connected WLAN radio is a multiple access point WLAN, in which neighboring access points share a same service set identifier (SSID) as the WLAN radio;
confirming that the received signal quality indicator (RSSI) in the WLAN status report is below a threshold value obtained from the plurality of parameters;
sending a scan command to the WLAN radio to obtain a measured received signal strength indicator (RSSI) of the WLAN radio; and
sending a WWAN ON command to the WWAN radio after confirming that a maximum RSSI is below the WLAN handover RSSI threshold, resulting in the WWAN radio being turned on;
wherein the WLAN status is received by the mobile device regardless of whether the WLAN radio is turned on.

5. The multi-radio mobile device of claim 4, wherein the handover manager turns off the WLAN radio after turning on the WWAN radio by:

starting the handover countdown timer after the WWAN ON command has been sent to the WWAN radio; and
sending a WWAN OFF command to the WWAN radio to turn off the WWAN radio if the WWAN radio does not get connected once the handover countdown timer expires.

6. The multi-radio mobile device of claim 1, wherein the WWAN status is received by the mobile device regardless of whether the WWAN radio is turned on.

7. The multi-radio mobile device of claim 2, the handover manager further to:

not turning off the WWAN radio as a result of the RSSI indicated in the WLAN status report not exceeding a sum of the WLAN handover RSSI threshold and the WLAN handover RSSI margin.

8. The multi-radio mobile device of claim 1, wherein the WWAN white list is updated according to the following criteria:

the WWAN base station ID from a WWAN status report is added to the WWAN white list if the WLAN radio is connected within a time specified by the WWAN white list timer after the WLAN ON command is issued to the WLAN radio; and
the WWAN base station ID is removed from the WWAN white list if the WLAN radio is not connected within a time specified by the WWAN white list timer after the WLAN ON command is issued to the WLAN radio.

9. The multi-radio mobile device of claim 2, further comprising:

a WLAN handover RSSI threshold optimization program to update the WLAN handover RSSI threshold used by the handover manager, the program comprising:
  a decision block to compare a signal threshold parameter $S(x)$, the signal threshold parameter being specific to the SSID of the connected AP, denoted as x, to the WLAN signal strength measurement obtained following a scan of the WLAN radio, wherein the decision block generates an outcome, D;
  an observation block to generate a result indicator, R, based on the outcome, D, from the decision block, wherein R specifies four different conditions: success, failure, false alarm, and unknown;
  a cognition block to estimate a failure rate and/or a false alarm rate based on R and thereafter update the signal threshold parameter, $S(x)$; and
  a database to store historical handover data as well as latest signal strength threshold for each known $S(x)$;
wherein the cognition block adds a new data sample comprising the result indicator, R, to the database such that the database comprises the latest signal strength threshold for each known SSID.

10. The multi-radio mobile device of claim 1, further comprising:

a traffic type optimization procedure to adjust the received signal strength threshold based on whether real-time traffic is active in the mobile device.

11. The multi-radio mobile device of claim 9, further comprising:

a low RSSI threshold optimization program to minimize false alarms; and
a high RSSI threshold optimization program to ensure a successful handover;
wherein the low RSSI threshold optimization program is executed when real-time traffic is not present and the high RSSI threshold optimization program is executed when real-time traffic is present.

* * * * *